United States Patent
Cahill et al.

(10) Patent No.: US 7,738,683 B2
(45) Date of Patent: Jun. 15, 2010

(54) ABNORMALITY DETECTION IN MEDICAL IMAGES

(75) Inventors: Nathan D. Cahill, West Henrietta, NY (US); Shoupu Chen, Rochester, NY (US); Zhaohui Sun, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 678 days.

(21) Appl. No.: 11/187,677

(22) Filed: Jul. 22, 2005

(65) Prior Publication Data

US 2007/0036402 A1 Feb. 15, 2007

(51) Int. Cl.
*G06K 9/00* (2006.01)

(52) U.S. Cl. .................. 382/128; 382/159; 600/408

(58) Field of Classification Search .......... 382/128, 382/130, 159; 600/407, 408
See application file for complete search history.

(56) References Cited

U.S. PATENT DOCUMENTS

| | | | |
|---|---|---|---|
| 4,913,157 A | 4/1990 | Pratt et al. |
| 4,981,783 A | 1/1991 | Augenlicht |
| 5,247,934 A | 9/1993 | Wehrli et al. |
| 5,539,838 A | 7/1996 | Shimura |
| 5,628,314 A | 5/1997 | Kumagai |
| 5,633,948 A | 5/1997 | Kegelmeyer, Jr. |
| 5,673,298 A | 9/1997 | Mazess |
| 5,732,697 A | 3/1998 | Zhang et al. |
| 5,817,020 A | 10/1998 | Ishii et al. |
| 5,825,936 A | 10/1998 | Clarke et al. |
| 5,881,124 A | 3/1999 | Giger et al. |
| 5,902,240 A | 5/1999 | Ishii et al. |
| 5,941,832 A | 8/1999 | Tumey et al. |
| 5,983,211 A | 11/1999 | Heseltine et al. |
| 5,987,094 A | 11/1999 | Clarke et al. |
| 6,075,878 A | 6/2000 | Yoshida et al. |
| 6,125,194 A | 9/2000 | Yeh et al. |
| 6,143,506 A | 11/2000 | Golub et al. |
| 6,266,435 B1 | 7/2001 | Wang |
| 6,266,453 B1 | 7/2001 | Hibbard et al. |
| 6,272,233 B1 | 8/2001 | Takeo |
| 6,317,617 B1 | 11/2001 | Gilhuijs et al. |

(Continued)

FOREIGN PATENT DOCUMENTS

WO WO 00/30021 5/2000

(Continued)

OTHER PUBLICATIONS

J. Modersitzki "Numerical methods for image registration" Oxford university, 2004.*

(Continued)

*Primary Examiner*—John B Strege

(57) ABSTRACT

A system for the detection of abnormalities in a medical image of a subject. The system includes an examination bundle, a learning engine, and a detecting engine. The examination bundle includes at least one medical image of the subject from a first modality and at least one medical image of the subject from a second modality. The learning engine is employed for determining the characteristics of abnormalities within the at least one medical image from the first modality and the at least one medical image from the second modality. The detecting engine is employed for detecting abnormalities within at least one of the medical images comprising the examination bundle.

12 Claims, 9 Drawing Sheets

U.S. PATENT DOCUMENTS

| | | | |
|---|---|---|---|
| 6,418,237 | B1 | 7/2002 | Takeo |
| 6,539,127 | B1 | 3/2003 | Roche et al. |
| 6,553,356 | B1 | 4/2003 | Good et al. |
| 6,609,021 | B1 | 8/2003 | Fan et al. |
| 6,640,130 | B1 | 10/2003 | Freeman et al. |
| 7,167,760 | B2 * | 1/2007 | Dawant et al. ............... 607/116 |
| 7,298,881 | B2 * | 11/2007 | Giger et al. ................. 382/128 |
| 2001/0031076 | A1 | 10/2001 | Campanini et al. |
| 2002/0022240 | A1 | 2/2002 | Wade et al. |
| 2002/0057826 | A1 | 5/2002 | Imamura et al. |
| 2002/0187502 | A1 | 12/2002 | Waterman et al. |
| 2003/0032860 | A1 | 2/2003 | Avni et al. |
| 2003/0076992 | A1 | 4/2003 | Banish et al. |
| 2003/0095696 | A1 | 5/2003 | Reeves et al. |
| 2003/0099388 | A1 | 5/2003 | Doi et al. |
| 2003/0105395 | A1 | 6/2003 | Fan et al. |
| 2003/0194121 | A1 | 10/2003 | Eberhard et al. |
| 2003/0216631 | A1 | 11/2003 | Bloch et al. |
| 2004/0068170 | A1 * | 4/2004 | Wang et al. ................. 600/407 |

FOREIGN PATENT DOCUMENTS

| | | |
|---|---|---|
| WO | WO 01/54065 | 7/2001 |
| WO | WO 02/43562 | 6/2002 |
| WO | 2005/001769 | 1/2005 |

OTHER PUBLICATIONS

Yuhua Ding et al., A Real-Time Curve Evolution-Based Image Fusion Algorithm for Multisensory Image Segmentation, ICASSP 2003, pp. v-13-v16.

E. Kramer et al., Fusing of Immunoscintigraphy Spect With CT or MRI for Improved Multimodality Image Interpretation, IEEE, pp. 1805-1806, Oct. 1992.

Isabelle Bloch et al., Data Fusion in 2D and 3D Image Processing: An Overview, IEEE, 1997, pp. 127-134.

Constantinos S. Pattichis et al., Medical Imaging Fusion Applications: An Overview, IEEE, 2001, pp. 1263-1267.

Christian Muller, Master Thesis, Support Vector Machine Based Detection of Tumours in Dynamic MRI Mammographs, University of Bielefeld, Bielefeld University, Feb. 17, 2004, pp. 1-84.

Karla Horsch et al., Optimizing Feature Selection Across A Multimodality Database in Computerized Classification of Breast Lesions, Medical Imaging 2002: Image Processing, Proceedings of SPIE, vol. 2684, pp. 986-992.

Berkman Sahiner et al., Multi-Modality CAD: Combination of Computerized Classification Techniques Based on Mammograms and 3D Ultrasound Volumes For Improved Accuracy in Breast Mass Characterization, Medical Imaging 2004: Image Processing, Proceedings of SPIE vol. 5370, pp. 67-74.

Andreas Hadjiprocopis et al., An Automatic Lesion Segmentation Method for Fast Spin Echo Magnetic Resonance Images Using an Ensemble of Neural Networks, 2003 IEEE XIII Workshop n Neural Networks for Signal Processing, pp. 709-718.

Contour Detection for the Breast Tumor in Ultrasonic Images Using Watershed Segmentation, Yu-Len Huang et al., Proceedings of the 2002 ICS: Workshop on Artificial Intelligence.

Maximum Likelihood Texture Analysis and Classification Using Wavelet-Domain Hidden Markov Models, Guoliang Fan et al., Proceedings of the $34^{th}$ Asilomar Conference on Signals, Systems and Computers, Pacific Grove, CA, Oct. 29-Nov. 1, 2000.

Robust Real-time Object Detection, Paul Viola et al., Second International Workshop on Statistical and Computational Theories of Vision—Modeling, Learning, Computing and Sampling, Vancouver, Canada, Jul. 13, 2001, pp. 1-25.

Contrast-enhanced breast MRI: factors affecting sensitivity and specificity, C.W. Piccoli, Eur. Radiol. 7, (Suppl. 5) 1997.

A Tutorial on Support Vector Machines for Pattern Recognition, Christopher J.C. Burges, Data Mining and Knowledge Dsicovery, 2, 1998, Kluwer Acedemic Publisher, Boston, MA.

A Review of Medical Image Registration, Calvin R. Maurer, Jr., MS et al., Jan. 28, 1993, Vanderbilt University, Nashville. Tennessee.

Alignment by Maximization of Mutual Information, Paul A. Violz, Massachusetts Institute of Technology Artificial Intellegence Laboratory, A.I. Technical Report No. 1548, 1995.

Text Book—Pattern Classification, Richard O. Duda et al., John Wiley & Sons Inc., 2001—ISBN: 0471056693.

Text Book—Mathmatical Techniques in Data Fusion, David L. Hall, Artech House, Inc., Norwood, MA—ISBN: 0890065586.

Text Book—Numerical Methods for Image Registration, Oxford University Press, 2004, IBSN: 0198528418, Feb. 1, 1992.

Text Book—Practical Methods of Optimization, $2^{nd}$ edition, R. Fletcher, 1987, ISBN: 0471915475.

Text Book—Calculus of Variations, S. Fomin et al., Dover Publishing, 2000, ISBN: 0486414485.

Text Bobk—Mammographic Image Analysis, R. Highnam et al, 1999, Klumer Acedemic Publishers, ISBN: 0792356209.

* cited by examiner

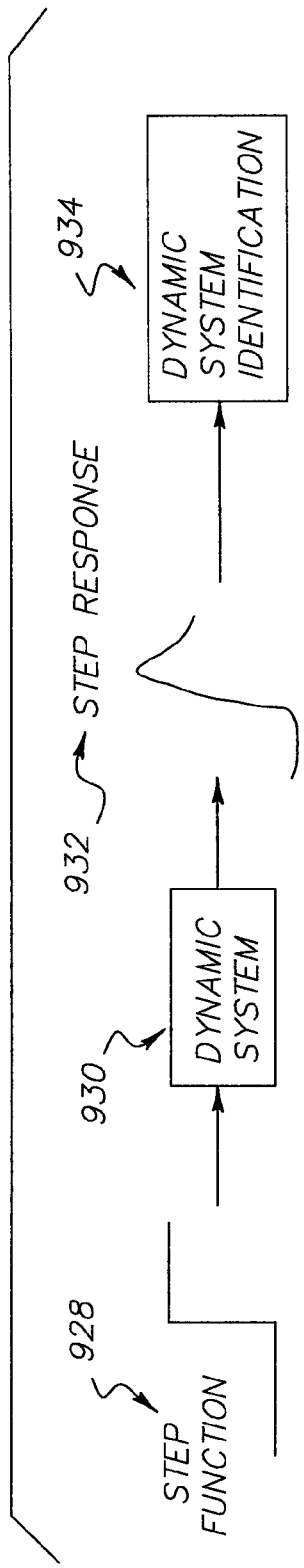
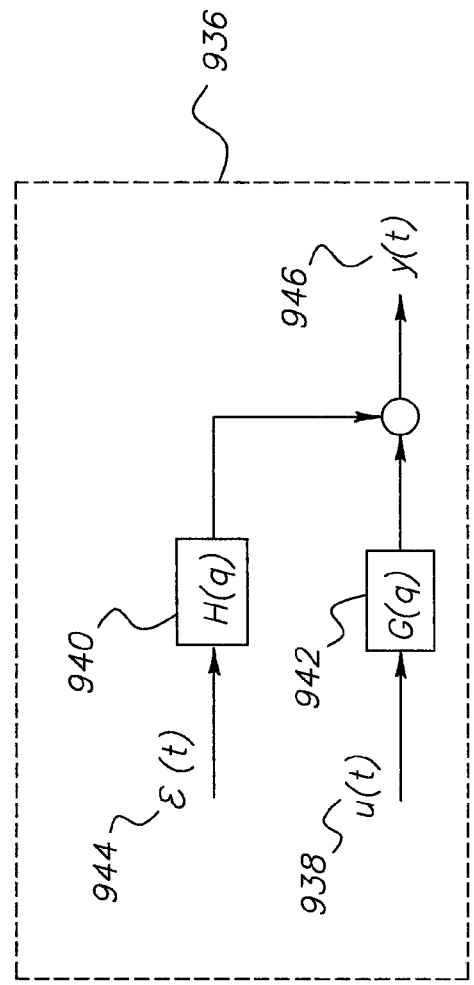
FIG. 9D
FIG. 9E

ABNORMALITY DETECTION IN MEDICAL IMAGES

FIELD OF THE INVENTION

The invention relates generally to the field of digital image processing, and in particular to the detection of abnormalities in a medical image.

BACKGROUND OF THE INVENTION

Medical imaging plays an important role in the screening, diagnosis, and/or treatment of many diseases because medical images enable a physician to view the internal anatomical structure of a patient or to visualize physiological or metabolic information. A variety of different imaging techniques or modalities can be used in clinical medicine. Some well known techniques/modalities include X-ray and computed tomography (CT), ultrasound, nuclear medicine, ultrasonic imaging, and magnetic resonance imaging (MRI). X-ray and CT, ultrasound, and MRI produce images of anatomical structure, whereas nuclear medicine produces images depicting metabolic uptake or biodistribution of radioactive compounds in various tissues (organs or tumors). Other modalities for imaging functional characteristics of physiological systems include functional MRI (fMRI), single photon emission computed tomography (SPECT), and positron emission tomography (PET). Still other modalities capture still images or video streams of internal structures by using a camera housed inside a scope. These modalities include colonoscopy, bronchoscopy, endoscopy, and capsule endoscopy.

Different techniques/modalities each have their strengths and weaknesses. For example, X-ray imaging has high spatial and intensity resolutions, shows bony anatomy with high detail, and is relatively inexpensive to use; however, it also presents the viewer with complex two-dimensional (2-D) views of superimposed anatomy. X-ray imaging can also have difficulty resolving soft tissue features.

MRI has the advantage of displaying three-dimensional (3-D) images of soft tissues with high contrast and high spatial resolution, and it does not involve ionizing radiation (as does X-ray and CT); however, MRI does not image bone well. CT imaging, based on X-ray absorption, produces 3-D images of bony anatomy, and increasingly, good definition of soft tissue, although MRI remains the preferred modality for viewing soft tissue.

Ultrasound imaging is easily portable, relatively inexpensive, and does not involve ionizing radiation. It has high spatial resolution and is extremely fast, enabling real-time frame capture rates. More recently, one unique and potentially powerful use of ultrasound has been discovered: measuring the elasticity of tissue, which can be useful in distinguishing tumor tissue from healthy tissue, for example, in the breast. A disadvantage of ultrasound is that it cannot easily image through gas or bones, making it difficult to obtain images of some organs.

Nuclear medicine provides images depicting metabolic information that can be early indicators of pathological conditions; however, it can be difficult to accurately pinpoint the location of anomalies in the body due to the lack of structural information in the images.

SPECT uses tomographic principles to provide a series of 2-D nuclear medicine images from nearby slices of tissue, effecting a 3-D nuclear medicine image; however, the spatial resolution can be slightly degraded. PET also is a tomographic technique that measures physiology and function, and provides images with higher spatial resolution and signal to noise ratio (SNR) than SPECT images. However, PET systems are very costly, because of the need for a cyclotron to produce positron-emitting nuclides. fMRI is not frequently used in clinical applications, with the exception of surgical planning, which aims to determine the areas of the brain that respond to specific cognitive tasks, in order to avoid those areas during surgery.

Scopes enable a visual inspection of the interior of a body lumen, such as the bronchi (bronchoscopy), the colon (colonoscopy), or upper gastrointestinal tract (endoscopy). Capsule endoscopy does not actually use a scope, but rather a swallowable capsule containing a camera that captures images while traveling through the entire gastrointestinal tract. Capsule endoscopy is more comfortable for the patient than endoscopy, and allows visualization deep within the intestines. However, the capsule and/or camera cannot be controlled or fixed on certain areas of interest, as can be done with a scope.

In some clinical applications, two or more modalities are used to capture medical images. In some applications, an image from one modality is used to screen for a disease, and then a subsequent image from another modality (usually of a higher resolution and/or diagnostic utility) is captured to verify a diagnosis or to gauge the progression of the disease. One example of this is when chest (X-ray) radiography is used to screen for lung nodules, lung cancer, or other respiratory diseases. Suspicious findings may cause a radiologist to order CT imagery to provide a high-resolution 3-D visualization of the affected area. Another example is (X-ray) mammography that is used to screen for breast cancer; a positive indication of breast cancer may then require a 3-D MRI of the breast for further investigation of tumors. A more recent example of a screening procedure is the use of CT imagery for virtual colonoscopy; the identification of suspicious regions or suspected polyps could result in a follow-up colonoscopy.

In addition to the use of images from multiple modalities in a screening/verification process, another common use of multi-modal medical imaging is to provide both anatomical and functional information. For example, in brain imaging, when cancer is suspected or diagnosed, CT and/or MR images may be captured to show the structure of the brain and any abnormalities, and PET or SPECT images may be captured to show any metabolic behavior of tumors or lesions. The combination of CT and PET imagery is used in the chest as well, in order to examine images of the lungs, liver, and kidneys. The CT/PET combination has been well received and devices capable of capturing both modalities simultaneously have been emerging in the marketplace (General Electric's Discovery LS PET/CT system and Siemens' biograph™ are two examples).

In other situations, images from multiple modalities may be captured even if the modalities provide some sort of structural information. CT and MR images of the brain or abdomen, or of orthopedic sites, may be captured at different times. The emergence of sonoelasticity, or measuring elastic properties of tissue using ultrasonic imaging, can be used to examine elasticity of the breast, providing structural information that complements mammograms or MR breast images.

However, even though medical imaging modalities provide a wide variety of visual information, many diseases are difficult to detect or diagnose. For example, one source estimates that around 20% of breast cancer cases are not detected by mammography.

In efforts to detect various types of cancers and of other diseases, many researchers have developed computer-assisted detection/diagnosis (CAD) techniques that aid the radiologist in detecting abnormalities.

CAD techniques directed to mammography are known. Refer, for example, to U.S. Pat. Nos. 5,633,948, 5,732,697, 5,941,832, 6,075,878, 6,266,435, 6,272,233, 6,418,237 and 6,553,356, and U.S. Patent Application Nos. 2001/0031076 and 2002/0057826.

CAD techniques applied to the detection of pulmonary nodules are also known. Refer, for example, to U.S. Pat. Nos. 5,539,838, 5,825,936, 5,881,124, 5,987,094, 6,125,194 and 6,609,021, U.S. Patent Applications Nos. 2003/0076992, 2003/0095696, 2003/0099388, and 200/30105395, and European Patent Nos. EP1,129,426, EP1,249,006, and EP1,395,165.

CAD applied to the detection of colorectal cancer is described in U.S. Pat. Nos. 4,981,783, 5,628,314.and 5,983,211, and U.S. Patent Application Nos. 2002/0187502, 2002/0022240, and 2003/0032860.

Osteoporosis and bone disease are the subject of CAD techniques in U.S. Pat. Nos. 4,913,157, 5,247,934, 5,673,298, 5,817,020, 5,902,240 and 6,143,506.

Even though these prior art techniques assist the medical practitioner in detecting and/or diagnosing disease, they apply to individual medical images or to multiple medical images from a single modality.

Some progress has been made in aligning and/or fusing images from multiple modalities. For example, U.S. Pat. No. 6,266,453 (Hibbard) is directed to a system for displaying multimodal image data (CT+MRI or CT+PET brain images) on a graphical user interface (GUI), enabling manual or automatic registration and fusion. U.S. Pat. No. 6,539,127 (Roche) relates to a method for registering general multimodal image data, based on correlation ratios between the data sets. U.S. Pat. No. 6,640,130 (Freeman) is directed to a system for fusing anatomic images with spectroscopic images of tissue or organs. U.S. Patent Application No. 2003/0216631 (Bloch) employs free form deformations to register PET and CT thoracic and abdominal images.

Although these methods and systems related to aligning and fusing images from multiple modalities, they do not address how to utilize the multimodal imagery to provide an enhanced method for detecting and/or diagnosing disease.

Existing CAD methods and systems apply to individual medical images or to multiple medical images from a single modality, and as such, they are not optimal when applied to a collection of images from multiple modalities. Registration and fusion techniques, while providing visually meaningful information to the medical practitioner, do not provide the same level of assistance as CAD systems.

The present invention addresses the problems and limitations of the prior art by providing a system and method for computer assisted detection and/or diagnosis of disease or abnormalities utilizing imagery from multiple modalities.

SUMMARY OF THE INVENTION

An object of the present invention is to provide a system and method for computer assisted detection and/or diagnosis of disease or abnormalities utilizing imagery from multiple modalities.

Any objects provided are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a system for the detection of abnormalities in a medical image of a subject. The system includes an examination bundle, a learning engine, and a detecting engine. The examination bundle includes at least one medical image of the subject from a first modality and at least one medical image of the subject from a second modality. The learning engine is employed for determining the characteristics of abnormalities within the at least one medical image from the first modality and the at least one medical image from the second modality. The detecting engine is employed for detecting abnormalities within at least one of the medical images comprising the examination bundle.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 9D shows a diagrammatic illustration of a general approach to identifying the behavior of a dynamic system.

FIG. 9E shows an exemplary realization of dynamic system modeling.

DETAILED DESCRIPTION OF THE INVENTION

Figure 1:
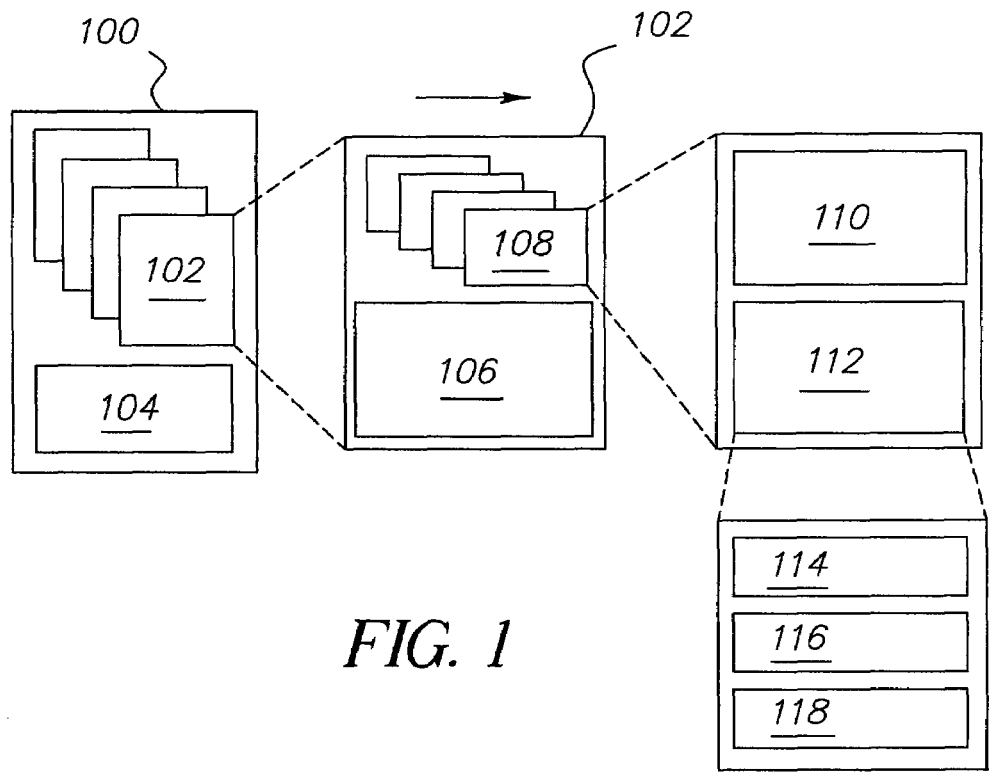
FIG. 1 shows a diagrammatic block diagram of images captured during a multimodal examination.

The following is a detailed description of the preferred embodiments of the invention, reference being made to the drawings in which the same reference numerals identify the same elements of structure in each of the several figures.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

During a typical imaging examination of a patient by at least two modalities, which will hereinafter be referred to as a multimodal examination, one or more images from each modality can be captured or reconstructed.

The images captured or reconstructed by a particular modality may be two-dimensional (2-D) images (containing pixels that are addressed in some two dimensional reference frame), three-dimensional (3-D) images (containing voxels addressed in some three dimensional reference frame), or four-dimensional (4-D) images (containing voxels addressed in some four dimensional reference frame). Note that a 3-D image may be represented by a series of 2-D images or slices. The third dimension may represent a spatial dimension or a temporal dimension, as in a temporal sequence of 2-D images.

Depending on the modality, images can be analyzed individually, or sequentially, as frames of a video sequence. An isolated image or frame without context has limited value. Some contextual information is frequently available prior to or during the image collection process; other contextual information can be gathered or generated as the images are processed after data collection. Any contextual information will be referred to as metadata. Metadata is any information that is not pixel or voxel data, for example, the image header data that accompanies many digital image files.

Referring now to FIG. 1, there is shown a block diagram of images captured during a multimodal examination in accordance with the present invention. A complete set of all images captured during a multimodal examination, along with any corresponding metadata, is shown in FIG. 1 as an examination bundle 100. Examination bundle 100 comprises a collection of modality instances 102 and a section containing general metadata 104. Each modality instance 102 includes modality-instance specific metadata 106 and one or more image packets 108. Modality-instance specific metadata 106 contains information about the modality and/or information specific to the instance of captured or reconstructed images. Such information may include the modality name and any pertinent settings chosen by the medical practitioner in exercising the modality for the specific instance of image capture.

Image packet 108 comprises two sections: the pixel or voxel data 110 of an image that has been captured or reconstructed, and image specific metadata 112.

Image specific metadata 112 can be further refined into image specific collection data 114, image specific physical data 116 and image specific inferred data 118.

Image specific collection data 114 contains information specific to the collection of the particular image data 110 in the image packet 108, such as 2-D view (e.g., axial, coronal or sagittal), image protocol, slice thickness, orientation of the patient relative to the imaging system (e.g., posterior-anterior, anterior-posterior, or lateral for chest radiography), frame information for image sequences (e.g., index number, capture rate, capture time, etc.), or exposure level for scope imagery.

Image specific physical data 116 contains information such as the relative position of the patient when the image was captured, or non-image sensed characteristics such as blood pressure, temperature, weight, etc.

Image specific inferred data 118 includes location and description of detected abnormalities within the image, and any pathology that has been identified. This data can be obtained either from a medical practitioner or by automated methods.

The general metadata 104 comprises such information as the date of the examination, the patient identification, the name or identification of the referring physician, the purpose of the examination, suspected abnormalities and/or diagnosis, and any information pertinent to the examination bundle 100. It can also include general image information such as image storage format (e.g., RAW, DICOM, TIFF, JPEG, etc.), number of lines, and number of pixels per line. It will be understood and appreciated that the order and specific contents of the general metadata or image specific metadata may vary without changing the functionality of the examination bundle.

Abnormalities that are present in medical imagery may be characterized and detected in a variety of ways. One common characterization is by a shape model. Certain abnormalities have unique geometric shapes, and their sizes are helpful for detection as well as disease staging and prognosis. For example, some tumors have round shapes and distinctive contours and tend to grow in size. In these cases, abnormality detection can be considered a task of seeking patterns with particular shapes in the medical image. These patterns may be described by a collection of geometric primitives, including corners, edges, junctions, bifurcation points, lines, circles, contours, and the like. These geometric primitives are detected by means tailored to the specific primitive. For example, corner detection comprises identifying points with unique intensity neighbors by finding the maxima on the gradient of the intensity surface. Lines can be detected by various edge detection schemes, or by searching for maxima in a Hough-transformed space (a space parameterized by the location and orientation of lines in the image). Similarly, circles can be parameterized by their origins and radii, and detected by the Hough transform. This can be an effective way to detect round tumors. Using the generalized Hough transform, ellipses can also be detected in images. Furthermore, it is possible to improve detection performance by incorporating prior knowledge of abnormalities, such as the location, size or orientation.

Another way abnormalities can be characterized is by templates, such as elastic models. Abnormality detection can then be accomplished by template matching. For elastic models, templates are modeled by a set of control points and elastic edges. This provides a more powerful representation is possible with geometric primitives. Certain body parts or abnormalities have unique shapes that are not straight lines or circles, but can be effectively modeled by templates. Some prior knowledge may be available for the template design, such as the general structure of the abnormality, the degree of smoothness, the number of control nodes, and the elastic forces. Template matching within the image proceeds by finding the set of template parameters that minimizes a predefined energy term. The energy term defines how well the template fits the image parts, the internal forces and the external forces. The optimization is usually carried out through an iterative procedure to find the best possible match. Abnormalities are detected if the final energy with the optimal parameter set is larger than certain threshold.

In more complicated scenarios where abnormalities are not readily characterized by geometric primitives or templates, more general pattern classification techniques can be used. Pattern classification (also referred to as pattern recognition) encompasses a wide variety of techniques for detecting and/or classifying objects that are present in signals. The signals include data such as 2-D images, 3-D images, or other forms of representations, and may be acquired through a variety of signal acquisition modalities. In medical imaging modalities, the signals generally represent physical objects (specifically human patients), and the objects to be detected and/or classified include abnormalities such as disease lesions, tumors, or various anatomical structures or regions. The task of pattern classification is to extract feature vectors, or any abstract characterizations of data, from the acquired signals and to use the extracted feature vectors to assign the object to a category or class. Pattern classification engines, or classifiers, perform this task and are trained prior to use.

The training of a classifier involves learning class characteristics from a set of example patterns (known as the training set). Two examples of different types of learning are: supervised learning and unsupervised learning. Supervised learning is defined as a learning process that seeks to reduce a function of costs associated with the desired output (class label) of each pattern in the training set. Unsupervised learning is defined as a learning process lacking external information on desired outputs (i.e. example patterns in the training set are not assigned class labels) that self-organizes or clusters patterns based on similarity or dissimilarity. (See "Pattern Classification," Richard O. Duda, Peter E. Hart and David G. Stork, $2^{nd}$ Ed., John Wiley & Sons, Inc., 2001.) Variations of the above two leaning methods also exist, such as reinforcement learning, in which the classifier learns class characteristics by computing the tentative class label for each pattern in the training set and using the known class labels to improve the learned characteristics.

The class characteristics that are extracted from example patterns can include properties related to the code values of the patterns, spatial properties of the patterns, temporal properties of a sequence of patterns, or properties related to transformed representations of the patterns.

Rather than making direct use of image pixels, training and classification algorithms may extract representative "attributes" from a transformed image domain. An exemplary transformed image domain is a wavelet domain (see, for example, G. Fan and X.-G. Xia, "Maximum Likelihood Texture Analysis and Classification Using Wavelet Domain Hidden Markov Models," *Proc. of the 34th Asilomar Conference on Signals, Systems, and Computers*, Pacific Grove, Calif., Oct. 29-Nov. 1, 2000). To illustrate a practical example, consider that six intra-band attributes consist of groups of eight Haar wavelet coefficients taken from single wavelet bands— 2×2 HL, 2×2 LH, 4×4 HL, 4×4 LH, 8×8 HL, 8×8 LH. Six inter-frequency attributes consist of groups of eight coefficients, one each for the following combinations: 16×16 and 8×8 HL; 8×8 and 4×4 HL; 4×4 and 2×2 HL; 16×16 and 8×8 LH; 8×8 and 4×4 LH; 4×4 and 2×2 LH. Four inter-orientation attributes consist of groups of eight Haar wavelet coefficients taken (4 from HL and 4 from LH) at 2×2, 4×4, 8×8 and 16×16 bands. Another attribute consists of eight coefficients; the attribute takes one coefficient from the corresponding spatial locations in all eight wavelet bands—16×16, 8×8, 4×4, 2×2 HL and LH. People skilled in the art may select any other combinations of attributes for different applications.

Training and classification algorithms may also extract representative "attributes" from an image transformed in the spatial domain. An exemplary spatial domain transformation is a grid pattern (GP) transformation (see, for example, S. Chen, "Method for Locating Faces in Color Images," U.S. patent application Ser. No. 10/211,011, which is incorporated herein by reference). To compute a grid pattern (GP) image, the original image is first converted to an integral image (see, for example, P. Viola and M. Jones, "Robust Real-time Object Detection," *Second International Workshop on Statistical and Computational Theories of Vision—Modeling, Learning, Computing, and Sampling*, Vancouver, Canada, Jul. 13, 2001). Each pixel of the GP image is then computed using four corner points of the corresponding cell (m×n pixels) in the integral image.

The computation of a pixel $p'_0$ in an integral image B is given by:

$$B(p'_0) = \sum_{\|p_i\| \leq \|p_0\|} A(p_i),$$

where $A(p_i)|_{\|p_i\| \leq \|p_0\|}$ defines a region in the original image A. Here, $p_i$ is a vector in the 2-D image plane having an origin at the upper left corner. Pixel $p_0$ in image A corresponds to pixel $p'_0$ in image B.

After an integral image has been obtained, a grid pattern image is computed. A cell in image B is defined by four corner points: $p'_1$, $p'_2$, $p'_3$, and $p'_4$. The computation of pixel intensity values in a corresponding cell for the GP image is expressed by:

$$\varphi = \frac{1}{mn}(B(p'_4) + B(p'_1) - B(p'_2) - B(p'_3))\bigg|_{\varphi \in \Phi[p_1, p_2, p_3, p_4]},$$

where $\Phi[p_1, p_2, p_3, p_4]$ is the cell defined by $p_1$, $p_2$, $p_3$, and $p_4$ in the GP image, $\phi$ is any pixel in cell $\Phi[p_1, p_2, p_3, p_4]$, $B(p'_x)$ is the pixel value at position $p'_x$ in the integral image (here, $p_1=p'_1$, $p_2=p'_2$, $p_3=p'_3$, and $p_4=p'_4$), m is the cell height and n is the cell width.

In the present invention, the training set can include a set of examination bundles, a set of modality instances, a set of image packets, a set of images, or any combination of these objects. In addition to extracting characteristics of the example patterns from the images themselves, characteristics may also be extracted from general metadata, modality-instance specific metadata, or image specific metadata. For example, in some instances, patient demographic data such as age, gender, weight, and race may be shown to correlate with the occurrence of certain conditions; such demographic data about a specific patient may be extracted from general metadata and used as additional attributes for training.

Figure 2A:
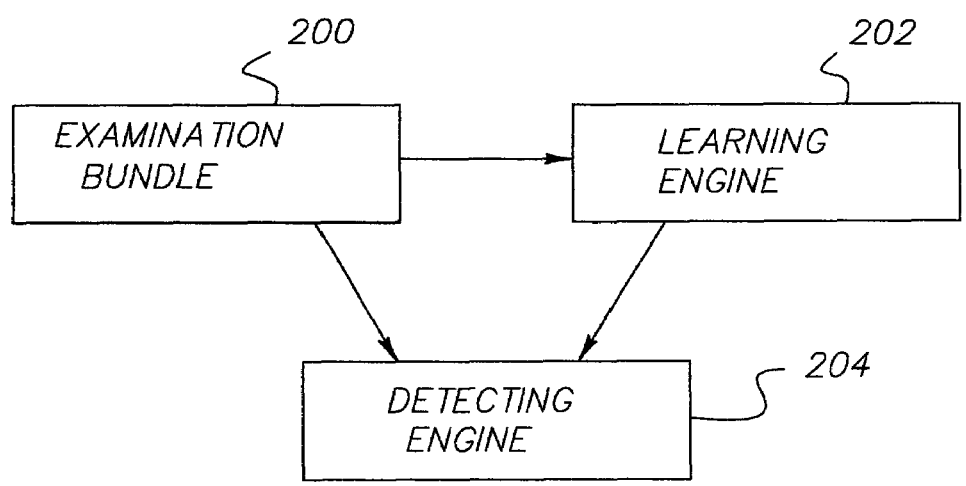
FIG. 2A shows a block diagram of a system for detecting abnormalities in a medical image of a patient in accordance with the present invention.

Referring now to FIG. 2A, there is shown a block diagram of a system for detecting abnormalities in a medical image of a patient in accordance with the present invention. Generally, the system comprises an examination bundle 200 that includes at least one medical image of the patient from a first modality and at least one medical image of the patient from a second modality; a learning engine 202 for determining the characteristics of abnormalities within medical images from both modalities; and a detecting engine 204 for detecting abnormalities within at least one medical image of the examination bundle.

Figure 2B:
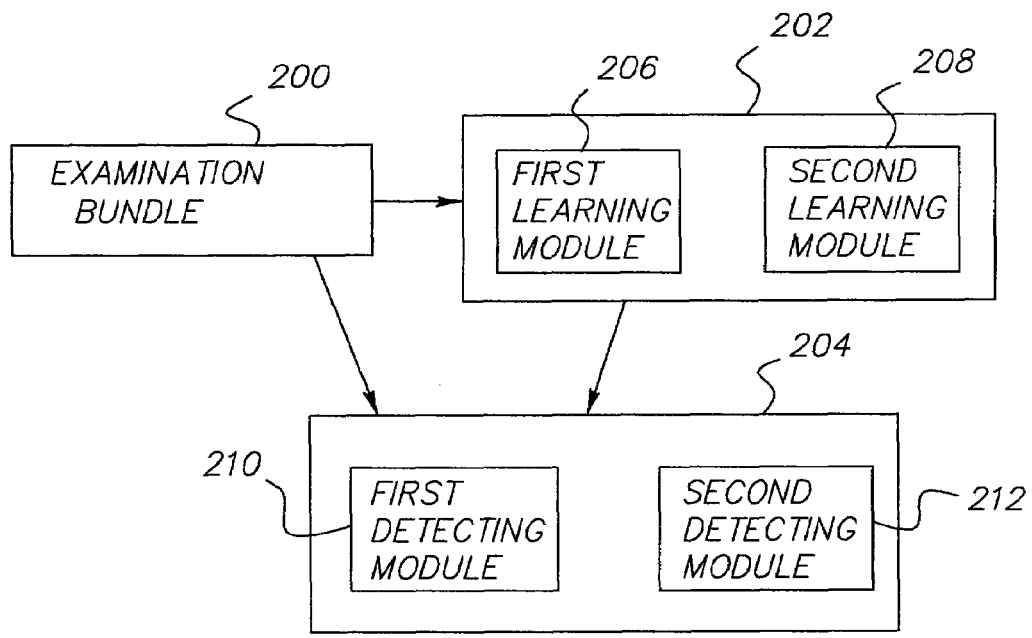
FIG. 2B shows a block diagram of a further embodiment of the system of FIG. 2A.

In an embodiment of the present invention, illustrated in FIG. 2B, learning engine 202 comprises a first learning module 206 for determining the characteristics of abnormalities within medical images of the first modality and a second learning module 208 for determining the characteristics of abnormalities within medical images of the second modality. In addition, detecting engine 204 comprises a first detecting module 210 for detecting abnormalities within at least one medical image of the first modality and a second detecting module 212 for detecting abnormalities within at least one medical image of the second modality.

First and second learning modules 206 and 208 store information pertinent to the characteristics of abnormalities. These characteristics can be provided manually or extracted automatically from general metadata 104, modality-instance specific metadata 106, image specific metadata 112, and/or the pixel or voxel data 110 of one or more images. The stored information can include information about geometric primitives or shape models describing abnormalities, templates or template parameters describing abnormalities, features extracted from images containing abnormalities or images not containing abnormalities, or a training set of exemplar abnormality patterns. The stored information may also contain weights describing the relative importance of the information in describing an abnormality. In embodiments employing pattern classification techniques, first and second learning modules 206 and 208 can use the stored information to train classifiers that will be used in the subsequent detecting engine 204.

Detecting engine 204 takes as input the examination bundle 200 and the learning engine 202, as shown by the arrows in FIGS. 2A and 2B. In the embodiment of FIG. 2B, first and second detecting modules 210 and 212 compare information present in examination bundle 200 with the stored information provided by first and second learning modules 206 and 208 in order to detect the presence of an abnormality.

The comparison can be of a variety of forms. In one example, pixel or voxel data 110 of one or more images from examination bundle 200 can be searched in order to find any instances of any geometric primitives or shape models that are listed in the stored information of learning modules 206 and 208. In another example, template matching can be performed on pixel or voxel data 110 of one or more images in examination bundle 200 in order to find any instances where the images contain abnormalities described by the templates in the stored information of learning modules 206 and 208. In another example, features from one or more regions in pixel or voxel data 110 of one or more images from examination bundle 200 can be extracted and classified using a classifier that has been trained by learning modules 206 and 208. Any resulting abnormalities identified by detecting engine 204 can be "absolutely" detected (that is, "An abnormality has been found," or, "An abnormality has not been found") or "probabilistically" detected (that is, "An abnormality exists with probability p").

In situations where multiple modalities are used to collect medical imagery, it is possible that the detecting modules may not both yield results indicating the same number of abnormalities located at the same positions in the patient. Therefore, detecting engine 204 accounts for differences in the results of the two detecting modules 210 and 212.

Figure 3A:
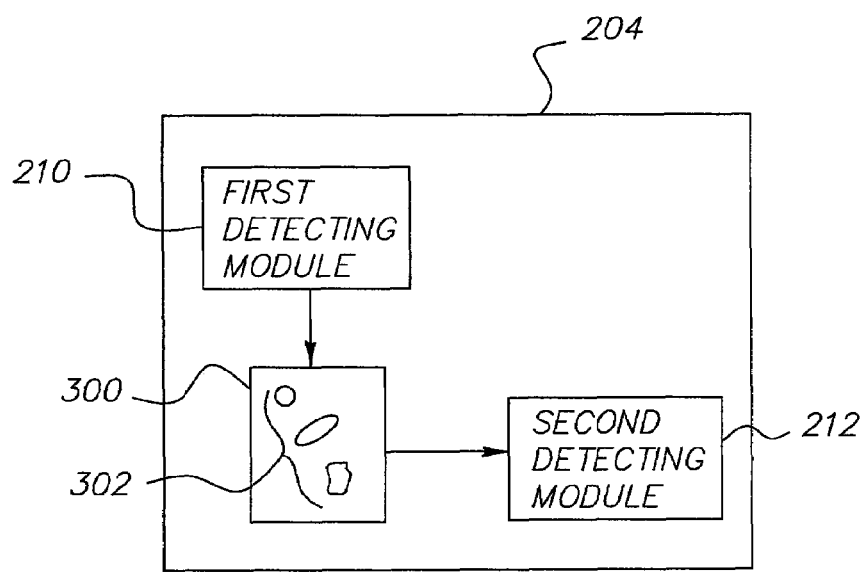
FIG. 3A shows a block diagram of an embodiment of a detecting engine in accordance with the present invention.

In one embodiment of detecting engine 204, as illustrated in FIG. 3A, first detecting module 210 detects one or more abnormalities 300 in one or more images from the first modality instance of examination bundle 200 Subsequently, second detecting module 212 detects one or more abnormalities in regions 302 of one or more images from the second modality instance of examination bundle 200, wherein regions 302 correspond to abnormalities detected by first detecting module 210. This embodiment is preferred when one of the modalities is generally more efficacious at detecting/classifying true abnormality regions than the other modality.

Figure 3B:
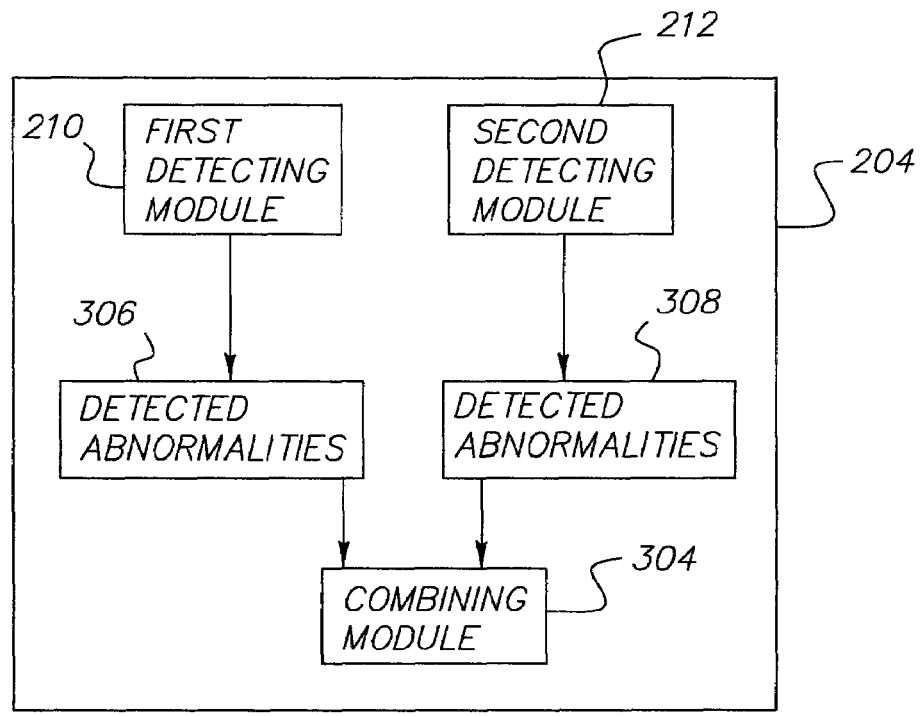
FIG. 3B shows a block diagram of another embodiment of a detecting engine in accordance with the present invention.

In another embodiment of detecting engine 204, illustrated in FIG. 3B, detecting engine 204 further comprises a combining module 304 for combining one or more detected abnormalities 306 from first detecting module 210 with one or more detected abnormalities 308 from second detecting module 212.

In this embodiment illustrated in FIG. 3B, unlike the embodiment shown in FIG. 3A, both detecting modules 210 and 212 operate independently; i.e., without input from the other detecting module. Combining module 304 can be chosen to operate in one of three manners. First, combining module 304 can eliminate abnormalities detected by only one of the detecting modules. In effect, with this option, the present invention identifies only abnormalities that have been detected in more than one of the imaging modalities. Second, combining module 304 can include abnormalities detected by at least one of the detecting modules. With this option, the present invention identifies all abnormalities that have been detected in any of the imaging modalities. Thirdly, combining module 304 can eliminate abnormalities detected by the second detecting module that have not been detected by the first module. With this option, the present invention identifies abnormalities detected by a chosen modality that also are detected in the other modality (but does not identify any other possible abnormalities).

Figure 4:
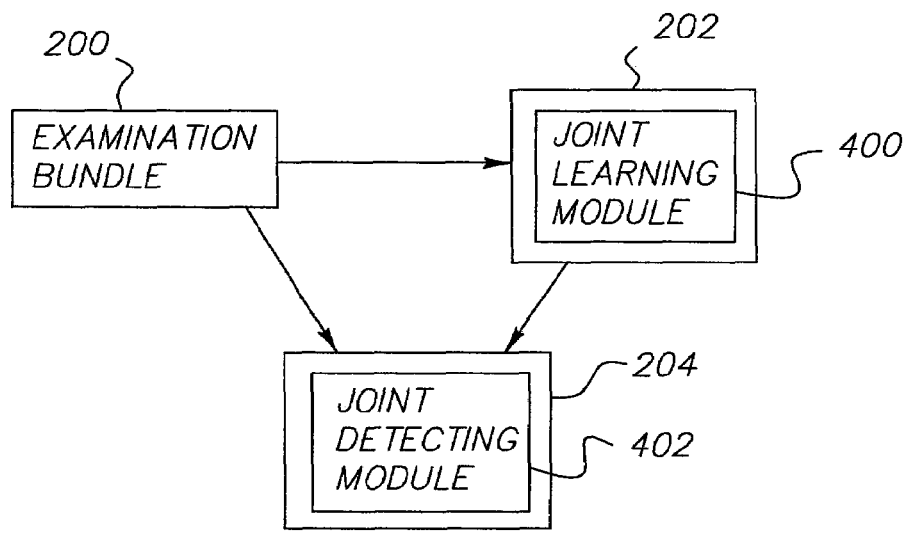
FIG. 4 shows a block diagram of a further embodiment of the system of FIG. 2B.

FIG. 4 illustrates an alternative embodiment to the embodiment of FIG. 2B. In this alternative embodiment, learning engine 202 comprises a joint learning module 400 for jointly determining the characteristics of abnormalities within medical images from both modalities. In addition, detecting engine 204 can comprise a joint detecting module 402 for jointly detecting abnormalities within medical images of both modalities.

Joint learning module 400 stores information pertinent to the characteristics of abnormalities as they appear in all of the imaging modalities present in the examination bundle 200 These characteristics can be provided manually or extracted automatically from general metadata 104, modality-instance specific metadata 106, image specific metadata 112, and/or the pixel or voxel data 110 of one or more images. The stored information can include, for example, information about geometric primitives or shape models describing abnormalities, templates or template parameters describing abnormalities, features extracted from images containing abnormalities or images not containing abnormalities, or a training set of exemplar abnormality patterns. The stored information may also contain weights/probabilities describing the relative importance of the information in describing an abnormality. In embodiments employing pattern classification techniques, joint learning module 400 can use the stored information to train a classifier that will be used in the subsequent detecting engine 204.

As illustrated in FIG. 4 by the arrows, detecting engine 204 employs as input examination bundle 200 and learning engine 202. In the embodiment of FIG. 4, joint detecting module 402 compares information present in the examination bundle 200 with the stored information provided by joint learning modules 400 in order to detect the presence of an abnormality. The comparison can be of a variety of forms. In one example, pixel or voxel data 110 of one or more images from examination bundle 200 can be searched in order to find any instance(s) of any geometric primitives or shape models that are listed in the stored information of joint learning module 400. In another example, template matching can be performed on the pixel or voxel data 110 of one or more images in examination bundle 200 in order to find any instance(s) where the images contain abnormalities described by the templates in the stored information of joint learning module 400. In a further example, features from one or more regions in pixel or voxel data 110 of one or more images from examination bundle 200 can be extracted and classified using a classifier that has been trained by joint learning module 400. Any resulting abnormality(s) identified by detecting engine 204 may be indicated as being "absolutely" detected (that is, "An abnormality has been found," or, "An abnormality has not been found") or "probabilistically" detected (that is, "An abnormality exists with probability p").

Other embodiments of the detecting engine 204 that rely on "soft" or probabilistic detection can utilize data fusion approaches that are well known in the art. For example, Bayesian analysis can be used to fuse potential abnormalities from multiple images, as can the Dempster-Shafer method, or the Generalized Evidence Processing Theory. The latter two data fusion techniques allow for abnormalities to be defined that are neither mutually exclusive nor exhaustively cover the entire realm of potential abnormalities. "Mathematical Techniques in Data Fusion," by David L. Hall, Artech House, Inc., Norwood, Mass., 1992, describes these and other approaches to data fusion. The use of such data fusion approaches by the detecting engine 204 is within the spirit and scope of the invention.

Figure 5:
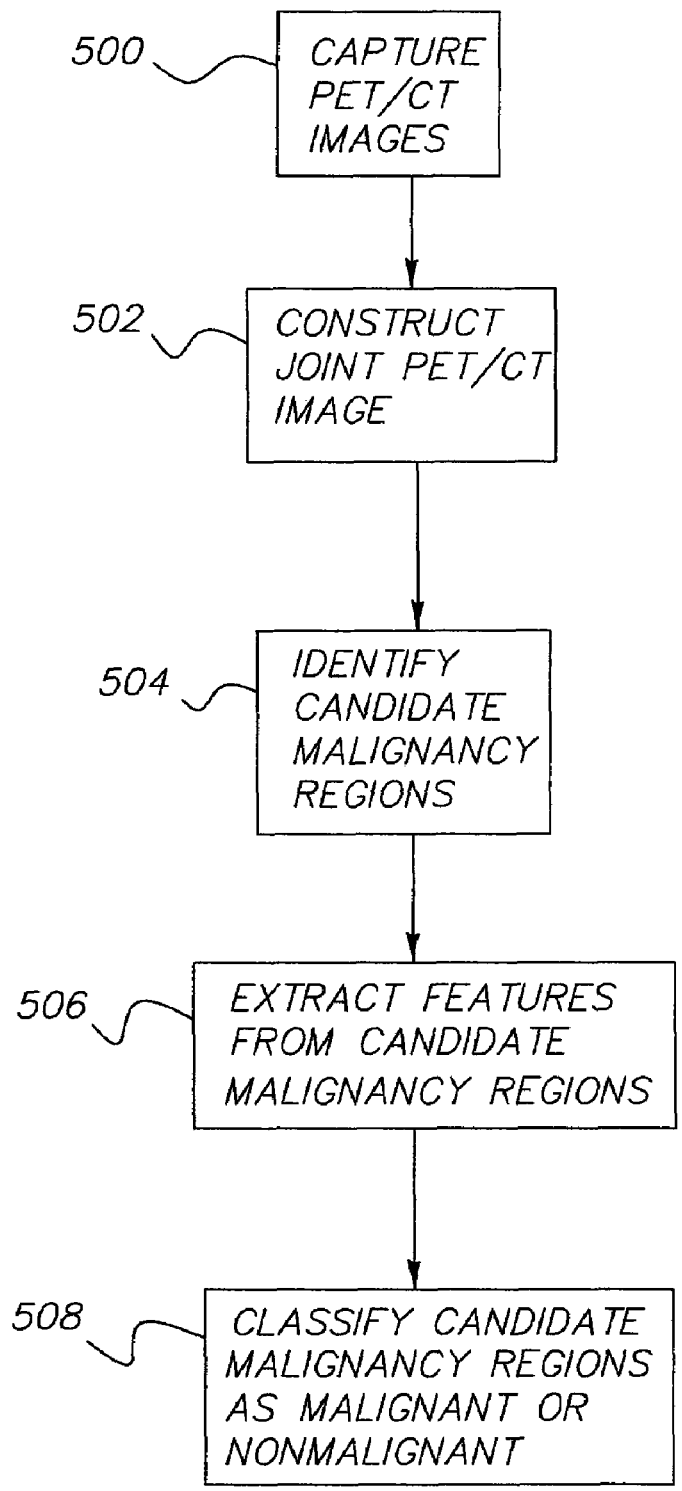
FIG. 5 shows an exemplary abnormality detection method in accordance with the present invention.

Referring now to FIG. 5, there is shown an exemplary abnormality detection system incorporating the embodiment illustrated in FIG. 4. The exemplary system uses a PET/CT device to collect imagery that will help determine whether or not a brain tumor is present in a patient. FDG (2-[$^{18}$F]-fluoro-2-deoxy-D-glucose) is a common radiopharmaceutical used as a PET tracer because it is well known that malignant tumors exhibit the hypermetabolism of glucose. However, such hypermetabolism can mimic the metabolism of glucose in gray matter structures of the brain, so FDG PET imaging alone is not generally sufficient for the detection of malignant tumors. The combination of FDG PET images with CT or MR images that provide structural information about the anatomy of the brain can help determine which structures are normal and which are malignant. In a PET/CT device, captured PET and CT images are effectively aligned in hardware. Therefore, normal and malignant structures in joint PET/CT images (constructed by "appending" the PET image to the CT image, making each voxel vector-valued) may exhibit different features than those in the PET or CT images alone.

Still referring to FIG. 5, in step 500, PET/CT images of a patient are captured using a device in which the images are aligned in hardware. In step 502, the PET and CT images are appended to form a joint PET/CT image containing vector-valued voxels. The first element of each vector contains the voxel value of the corresponding PET image, and the second element of each vector contains the voxel value of the corresponding CT image. In step 504, candidate malignancy regions are identified in the joint PET/CT image. In one embodiment, sliding or distinct windows over a regular grid of voxels are chosen as candidate malignancy regions. More sophisticated approaches to choosing candidate malignancy regions include choosing regions that correspond to high glucose uptake in the PET image. Once the candidate malignancy regions have been chosen, features are extracted from the joint PET/CT image in step 506 that are then used to classify the candidate malignancy region in step 508 as malignant or non-malignant. The features that are extracted can include features based on the vector-values of the voxels themselves, on shape or morphological information, or on transformations of the values. The classification step 508 relies on a previous learning engine that has been trained on known malignant and non-malignant regions of joint PET/CT brain images.

Figure 6:
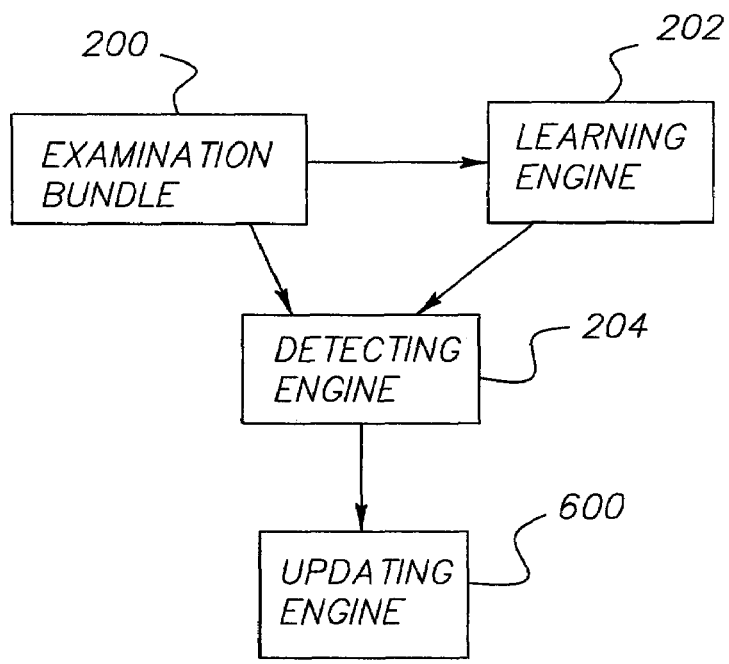
FIG. 6 shows a block diagram of a further embodiment of the system for detecting abnormalities in a medical image of a patient in accordance with the present invention.

FIG. 6 illustrates another embodiment of the present invention. This embodiment differs from the embodiment of FIG. 2A in that it further comprises an updating engine 600 for updating examination bundle 200 in order to indicate any detected abnormalities. The updating takes the form of modifying one or more of the following components of the examination bundle 200: general metadata 104, modality-instance specific metadata 106, image specific metadata 112, and/or the pixel or voxel data 110 of one or more images.

The modification made by updating engine 600 can be by the addition of an indicator of the presence of any detected abnormalities, an indicator of the number of detected abnormalities, an indicator (or indicators) of the location of any detected abnormalities, and/or an indicator (or indicators) of any feature describing any detected abnormalities. Other means for making the modification may be known to those skilled in the art. Indicators may be in the form of extra metadata, mask images indicating the positions of detected abnormalities, and/or modification of the image data itself to indicate the presence of detected abnormalities, or the like.

In the aforementioned example of multimodal images of the brain captured by a PET/CT device (referenced with regard to FIG. 5), the PET and CT images are inherently aligned due to the way they are captured. In many multimodal imaging situations, however, there is no inherent alignment, which makes detection of abnormalities appearing in both modalities difficult. In these situations, it is important to obtain some knowledge of how images from one modality correspond to images from another modality. Once such a correspondence relationship has been determined, the detecting engine is able to determine whether or not abnormalities detected in one image correspond to abnormalities detected in another image.

A variety of techniques are known to determine a correspondence relationship between multimodal images. Many of these techniques can be categorized as techniques for registering the multimodal images. (Alternatively, each multimodal image can be registered to a common, or atlas, image, establishing an indirect correspondence relationship.) Image registration, or more specifically multimodal image registration, has a long and broad history, and is well summarized in J. Modersitzki, "Numerical Methods for Image Registration," Oxford University Press, 2004. Image registration techniques can be roughly categorized as being parametric or non-parametric. Parametric techniques include landmark-based, principal axes-based, and optimal linear registration, while non-parametric techniques include elastic, fluid, diffusion, and curvature registration.

Parametric registration techniques involve defining a parametric correspondence relationship between the images. Popular parameterizations include rigid transformations (rotation and translation of image coordinates), affine transformations (rotation, translation, horizontal and vertical scaling, and horizontal and vertical shearing of image coordinates), polynomial transformations, and spline transformations. Landmark-based registration techniques involve the identification of corresponding features in each image, where the features include hard landmarks such as fiducial markers, or soft landmarks such as points, corners, edges, or regions that are deduced from the images. This identification can be done automatically or manually (as in a graphical user interface). The parametric correspondence relationship is then chosen to have the set of parameters that minimizes some function of the errors in the positions of corresponding landmarks.

Principal axes-based registration overcomes the problems of identifying the location and correspondence of landmarks in the images. The principal axes transformation (PAT) registration technique, described in Maurer, C. and Fitzpatrick, J., "A Review of Medical Image Registration," *Interactive Image-Guided Neurosurgery*, pp. 17-44, 1993, considers each image as a probability density function (or mass function). The expected value and covariance matrix of each image convey information about the center and principal axes, which can be considered features of the images. These expected values and covariance matrices can be computed by optimally fitting the images to a Gaussian density function (by maximizing log-likelihood). Alternatively, an approach that is more robust to perturbations involves fitting the images to a Cauchy or t-distribution. Once computed, the centers and principal axes of each image can be used to derive an affine transformation relating the two images.

Optimal linear registration (or more generally, optimal parametric registration) involves finding the set of registration parameters that minimizes some distance measure of the image pixel or voxel data. Popular choices of distance measure include the sum of squared differences or sum of absolute differences (which are intensity-based measures), correlation coefficient or normalized correlation coefficient (which are correlation-based measures), or mutual information. Mutual information is an entropy-based measure that is widely used to align multimodal imagery. P. Viola, "Alignment by Maximization of Mutual Information," Ph. D. Thesis, Massachusetts Institute of Technology, 1995, provides a thorough description of image registration using mutual information as a distance measure. The minimization of the distance measure over the set of registration parameters is generally a nonlinear problem that requires an iterative solution scheme, such as Gauss-Newton, Levenberg-Marquardt, or Lagrange-Newton (see R. Fletcher, "Practical Methods of Optimization," $2^{nd}$ Ed., John Wiley & Sons, 1987).

Non-parametric registration techniques treat registration as a variational problem. Variational problems have minima that are characterized by the solution of the corresponding Euler-Lagrange equations (see S. Fomin and I. Gelfand, "Calculus of Variations," Dover Publications, 2000, for details). Usually regularizing terms are included to ensure that the resulting correspondence relationship is diffeomorphic. Elastic registration treats an image as an elastic body and uses a linear elasticity model as the correspondence relationship. In this case, the Euler-Lagrange equations reduce to the Navier-Lamé equations, which can be solved efficiently using fast Fourier transformation (FFT) techniques. Fluid registration uses a fluid model (or visco-elastic model) to describe the correspondence relationship between images. It can provide for flexible solutions, but the computational cost can be high. Diffusion registration describes the correspondence relationship by a diffusion model. The diffusion model is not quite as flexible as the fluid model, but an implementation based on an additive operator splitting (AOS) scheme provides more efficiency than elastic registration. Finally, curvature registration uses a regularizing term based on second order derivatives, enabling a solution that is more robust to larger initial displacements than elastic, fluid, or diffusion registration.

Many of these well-known image registration techniques are described in the literature with respect to the registration of 2-D images. When registering 3-D images or volumes, one choice is to apply these registration techniques to pairs of 2-D slices of the 3-D images. This works in some situations, but requires some knowledge of how to choose which slices to pair. Another choice is to actually extend these registration techniques to three dimensions. All of these techniques are extendable to multiple dimensions, but generally with an exponentially increasing computational cost.

Figure 7:
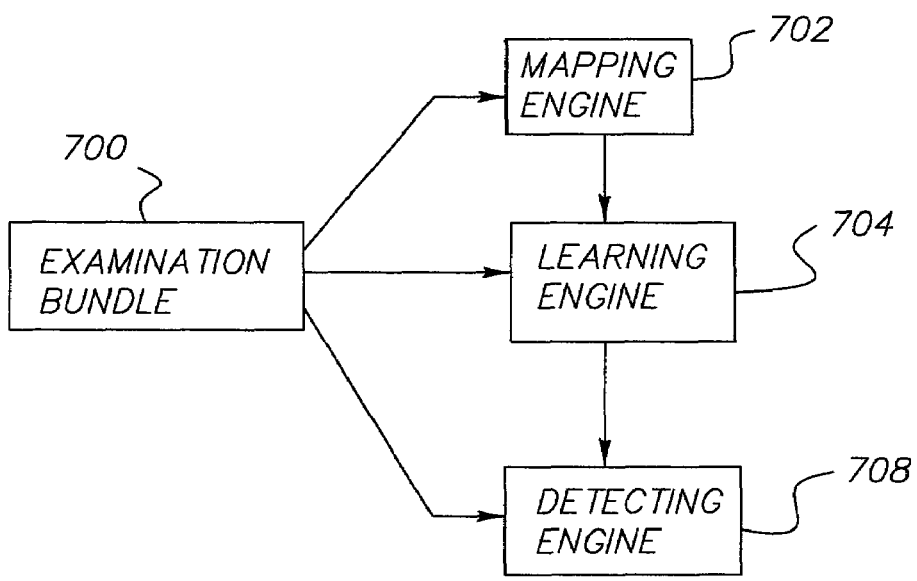
FIG. 7 shows a block diagram of yet a further embodiment of the system for detecting abnormalities in a medical image of a patient in accordance with the present invention.

Referring to FIG. 7, there is illustrated an alternative embodiment of the present invention comprising an examination bundle 700 that includes at least one medical image of the patient from a first modality and at least one medical image of the patient from a second modality, a mapping engine 702 for defining a correspondence relationship between at least one medical image from the first modality and at least one medical image from the second modality, a learning engine 704 for determining the characteristics of abnormalities within medical images from both modalities and a detecting engine 706 for detecting abnormalities within at least one medical image of the examination bundle.

The correspondence relationship defined by mapping engine 702 may comprise registering at least one image from the first modality to at least one image from the second modality, or it may comprise registering at least one image from each modality to an atlas image or model. The registration scheme employed may be parametric or non-parametric, and it may include intensity-based, correlation-based, or mutual information-based registration.

The embodiment of FIG. 7 can be employed in the analysis of breast images to detect microcalcifications or masses. X-ray mammography of the breast is the most frequently performed technique for screening for breast cancer, and much effort has gone into the analysis of x-ray mammographic images, and into the automatic or user-assisted detection of microcalcifications and masses (see, for example, R. Highnam and M. Brady, *Mammographic Image Analysis*, Kluwer Academic Publishers, 1999). Many algorithms for mass detection involve the alignment of the image of one breast with the image of the other, or with a temporally separate image of the same breast, followed by the comparison of the aligned images to identify differences. As detailed in the Highnam reference, features can be extracted from the radiograph and used to determine whether or not the image falls within the range of images of "normal" breasts.

Modern medical ultrasound equipment provides real-time high-resolution imaging without the use of ionizing radiation, and it is relatively inexpensive and portable. The cost effectiveness and portability of this modality is practically very attractive in hospitals where complex medical imaging facilities are not available. Ultrasound imaging is applicable to variety of medical diagnostic applications. An exemplary application is ultrasound breast imaging for breast cancer prescreening. Suspected malignant cases can be further diagnosed using the more sophisticated MRI imaging.

It is found that analyzing ultrasonic image homogeneity of internal echo (textual features) can assist in differentiating benign lesions from malignant ones (see Contour Detection for the Breast Tumor in Ultrasonic Images Using Watershed Segmentation", by Yu-Len Huang and Xun-Yao Lin, Proceedings of the 2002 ICS: Workshop on Artificial Intelligence). Different tissues in an ultrasound image have different textures. To classify the textual features, an exemplary unsupervised learning classifier can be used. This classifier employs a self-organizing map that consists an input layer, a single hidden layer and a mapping array of outputs. The self-organizing map defines a mapping from the higher dimension of input feature vector space onto a two-dimensional mapping array. With every neuron in the mapping array, a parametric weight vector is associated. An input feature vector is compared with all parametric weight vectors. A best match is defined as the self-organizing map's response.

The input (textual) feature vectors of an ultrasound image are generated with a mean-removed normalized auto-correlation method. Denote $U(x, y)$ as an ultrasound breast image (and also image pixel value) where x and y are the horizontal and vertical indices respectively for the image ($x \in [1, \ldots X]$, and $y \in [1, \ldots Y]$). A two dimensional mean-removed normalized auto-correlation coefficient between pixel at location (x, y) and pixel at location ($x+\delta x, y+\delta y$) can be computed as:

$$\vartheta_{x,y}(\delta x, \delta y) = \frac{1}{(X - \delta x)(Y - \delta y)} \sum_{x=0}^{X-1-\delta x} \sum_{y=0}^{Y-1-\delta y}$$

$$|(U(x + \delta x, y + \delta y) - \overline{U})(U(x, y) - \overline{U})|,$$

where $\overline{U}$ is the mean value of image U(x, y) for $x \in [1, \ldots X]$, and $y \in [1, \ldots Y]$, $\delta x$ and $\delta y$ are lags between two pixels in the x and y directions respectively. The mean-removed normalized auto-correlation coefficients $\Theta_{x,y}(\delta x, \delta y)$ and a variance value of an image can be used as the input vector to the self-organizing map.

X-ray mammographic images and ultrasound images of a breast can provide unique and complementary information about the presence of a mass and the distinction of whether a mass is malignant or benign. If correspondence is established between the x-ray image and the ultrasound image, these complementary features can be used jointly to provide a more informed computer "opinion."

Figure 8:
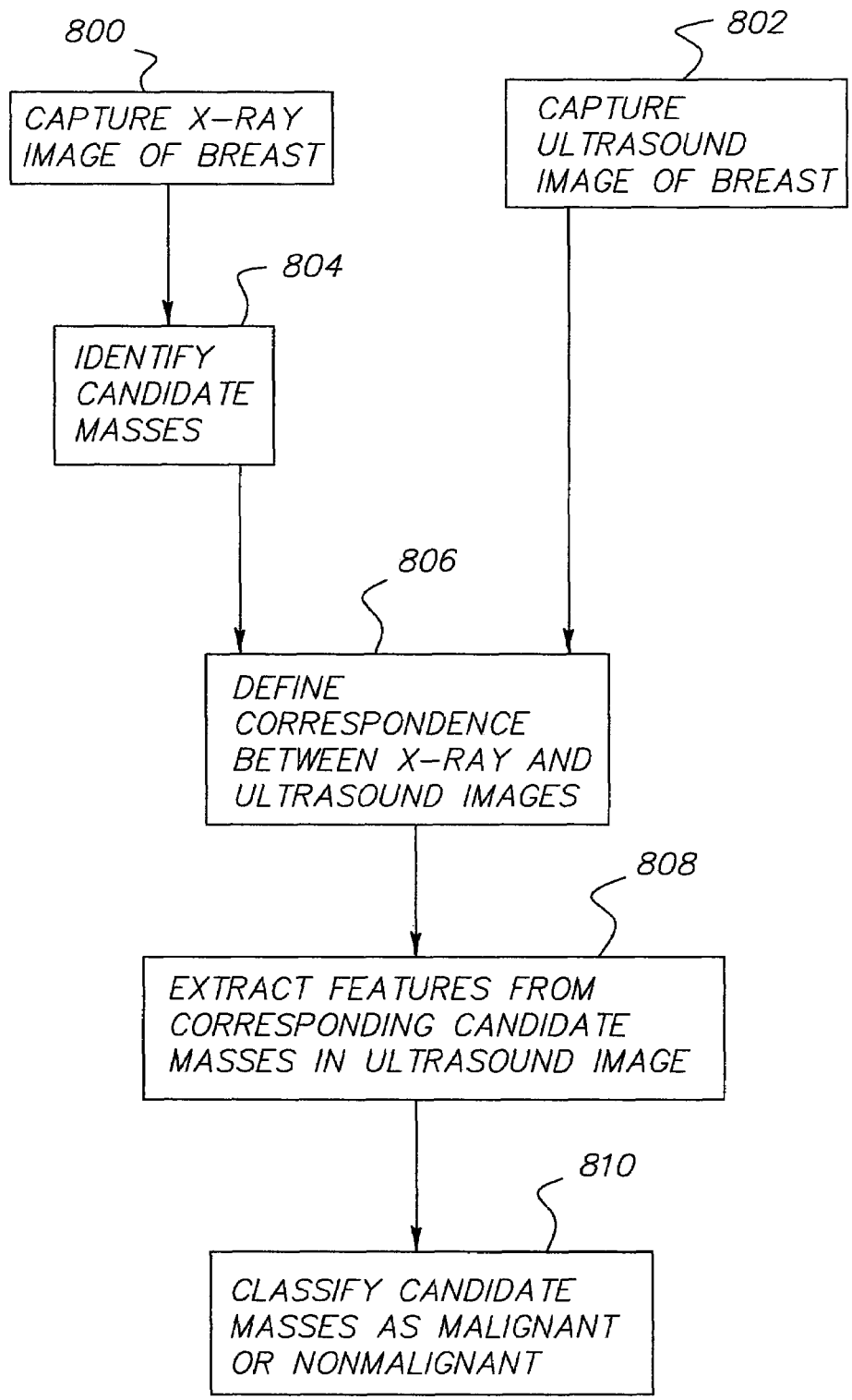
FIG. 8 shows an exemplary abnormality detection method in accordance with the present invention.

Consider, for example, the embodiment of FIG. 7, as illustrated by the flow diagram of FIG. 8. In steps 800 and 802, x-ray mammographic and ultrasound images, respectively, are captured of the breast. In step 804, candidate masses are identified in the x-ray mammographic image using techniques known to those skilled in the art (for example, such as according to the aforementioned Highnam reference). In step 806, a correspondence is established between the x-ray mammographic image and the ultrasound image by identifying the region or regions in the ultrasound image corresponding to any identified candidate masses in the x-ray mammographic image. In step 808, features are extracted from the ultrasound image regions corresponding to candidate masses. The features can include the aforementioned mean-removed normalized auto-correlation coefficients and variance values. Finally, in step 810, the extracted features are used to classify each candidate mass as malignant or non-malignant (using, for example, a self-organizing map).

Referring now to FIGS. 9A-9E, another exemplary embodiment of a method employed by the system of the present invention is described. The exemplary embodiment is a method of automatically detecting abnormal tissue from MR breast images sets that are acquired before and after the injection of a contrast agent. Although each set of breast images is captured from the MR modality, the pre and post contrast agent injection images can be considered as two different modalities. The method is broken down into a set of processes that each performs a specific functionality such as alignment, subtraction, segmentation, system identification, and classification. In this embodiment, abnormal tissue detection is accomplished by means of dynamic system parameter classification, which is a type of supervised classification.

Figure 9A:
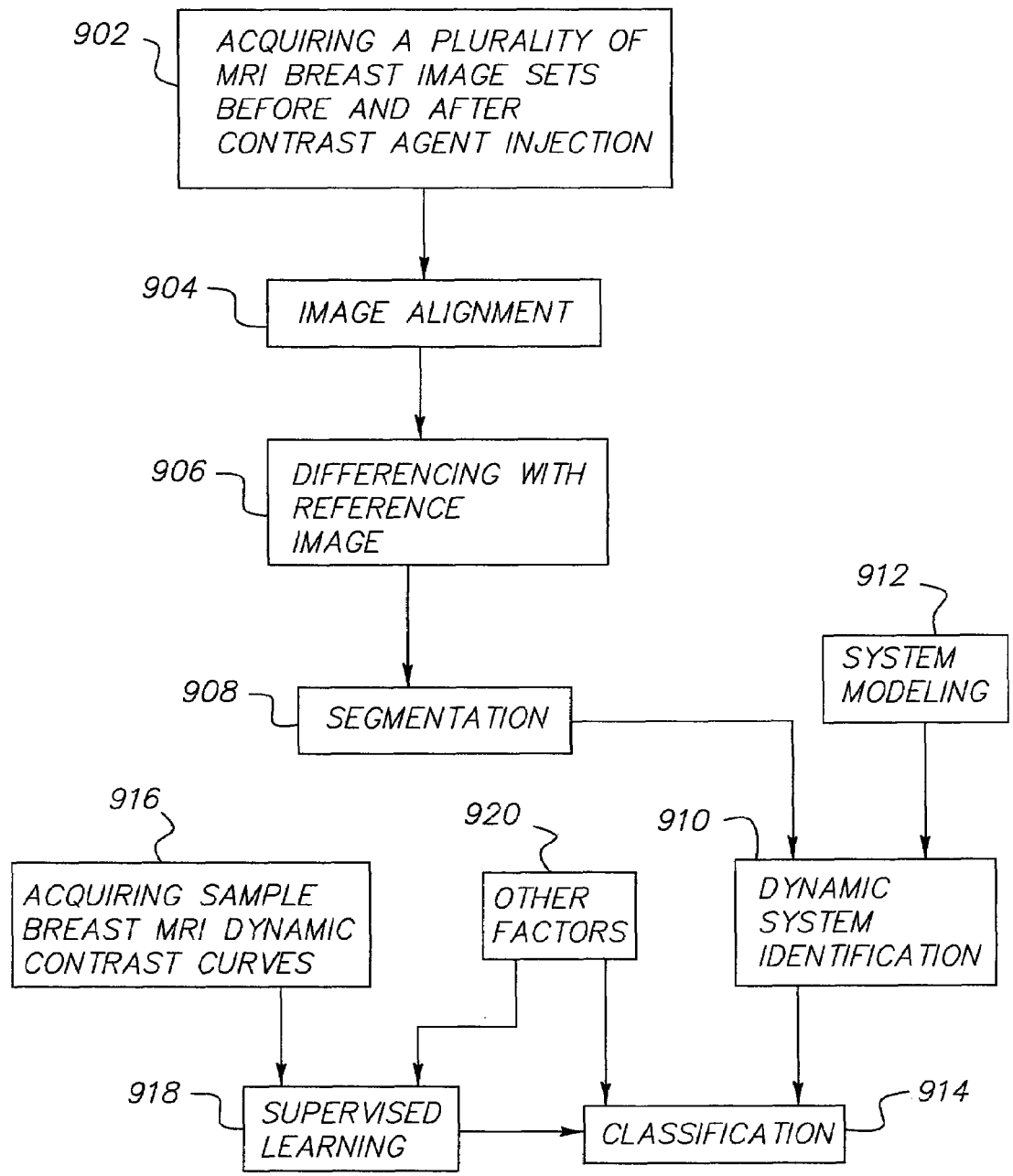
FIG. 9A shows an exemplary abnormality detection method in accordance with the present invention.

In the flow diagram shown in FIG. 9A, a first step 902 is acquiring a plurality of MR breast image sets prior to and after the injection of a contrast agent. Denote $I_0(x, y, z)$ as a MR breast image before injection of the contrast agent. Note that $I_0(x, y, z)$ comprises a series of spatially ordered images (slices). Define $z \in [1, \ldots S]$ as the spatial order index, where s is the number of images in the set. Then x and y are the horizontal and vertical indices, respectively, for an image, and $x \in [1, \ldots X]$ and $y \in [1, \ldots Y]$. After the administration of the contrast agent, a plurality of MR breast image sets are acquired, with each set containing the same number (S) of images of the same breast in the same spatial order z. The plurality of MR breast image sets is taken with a temporal resolution on the order of one minute. The MR breast image sets acquired after injection of the contrast agent can be expressed by $I_k(x, y, z)$, where k is the temporal order index, and $k \in [1, \ldots K]$. Note that for any $k \in [0, \ldots K]$ and for specific values of x, y and z, $I_k(x, y, z)$ represents the pixel or voxel value at the location (x, y, z) of the MR breast image.

The presence of contrast agent as recorded by an image voxel results in an increased signal that can be observed over the course of the image acquisition process. Different tissue types exhibit different rates of contrast uptake; therefore, a study of these signal-time curves can enable identification of the different types of tissue. For the purpose of automatic detection of abnormal tissues, the K sets of MR images, $I_k(x, y, z)$, taken after the injection of contrast agent, must be spatially aligned with a reference set of MR images. This alignment is performed in step 904. In general, the reference set of MR images is the set of MR images, $I_0(x, y, z)$, taken before the injection of the contrast agent. The alignment process ensures that pixels belonging to the same tissue region of the breast have the same x, y coordinates in all of the K sets of images. A preferred method for registration involves defining the correspondence function to be non-rigid. However, any of the aforementioned registration techniques may be used.

Figure 9B:
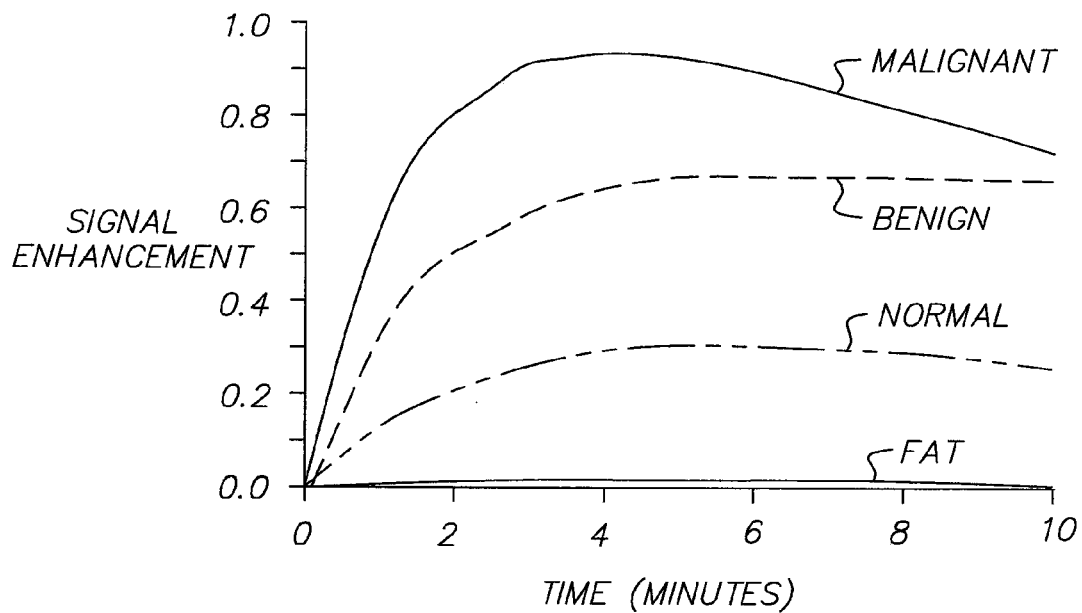
FIG. 9B shows a diagram of the increase in image pixel/voxel intensity for different breast tissues.

As shown in FIG. 9B, image pixel/voxel intensity increases differently for different breast tissues after the injection of contrast agent. This phenomenon suggests that subtracting the image taken prior to the injection of the contrast agent from an image taken after the injection will provide the medical practitioner with clearer information about the locations of abnormal tissues in the image. This information can also be used to extract regions from the original MR breast images for automatic detection and differentiation of abnormal tissue.

Step 906 in FIG. 9A carries out the processes of subtracting the reference MR image set $I_0(x, y, z)$ from each of the plurality of MRI breast image sets $I_k(x, y, z)$, $k \in [1, \ldots K]$, yielding a plurality of difference image sets, $\delta I_k(x, y, z)$, $k \in [1, \ldots K]$.

In step 908 of FIG. 9A, the difference images $\delta I_k(x, y, z)$ are subjected to a segmentation process that first produces a plurality of mask image sets, $M_k(x, y, z)$, $k \in [1, \ldots K]$. The mask image sets are formed by thresholding the difference images; i.e., the mask images contain zeros in positions where the corresponding pixel/voxel of the difference image is less or equal to a certain threshold T, and ones in positions where the corresponding pixel/voxel of the difference image is greater than T. After the mask image sets are produced, the MR breast image sets $I_k(x, y, z)$ are segmented according to the non-zero pixels in the mask images $M_k(x, y, z)$ to obtain segmented images $S_k(x, y, z)$, for $k \in [1, \ldots K]$. The segmented image $S_k(x, y, z)$ contains zeros wherever $M_K(x, y, z)$ does, and it contains the values of $I_k(x, y, z)$ in positions where $M_k(x, y, z)$ contains ones. People skilled in the art understand that in practical implementation, the stage of generating mask images can be omitted and the segmentation process can directly produce the segmented images $S_k(x, y, z)$ from the MR breast image sets.

Figure 9C:
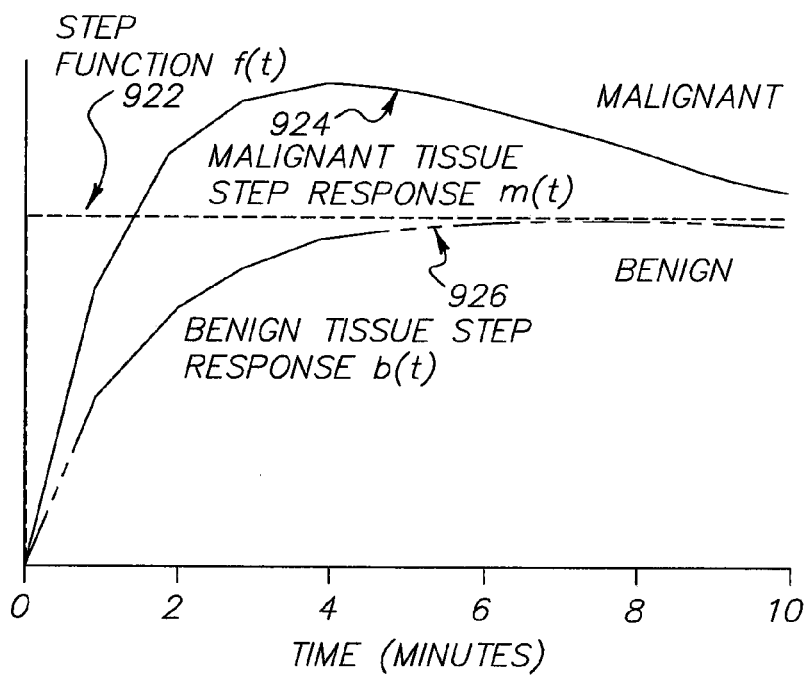
FIG. 9C further illustrates the diagram of FIG. 9B.

FIG. 9C is a replica of FIG. 9B, with the insertions of a step function, $f(t)$ 922 and the removal of the normal and fat tissue curves. (Note: the step function, $f(t)$, is defined as $f(t<0)=0$, $f(t \geq 0) = |\lambda|, \lambda \neq 0$). It is the intention of the present invention to detect abnormal tissues, and, more importantly, to differentiate malignant from benign tissues. Pixels belonging to normal and fatty tissues are set to zeros in images $S_k(x, y, z)$ in the segmentation step 908. The remaining pixels in images $S_k(x, y, z)$ belong to either malignant or benign tissues. It is practically difficult, if not impossible, to differentiate malignant tissue from benign tissue by assessing pixel/voxel intensity in a static form (in individual images). However, in a dynamic form, the intensity changes present a distinction between these two types of tissues.

As shown in FIG. 9C, starting from time zero, the brightness (contrast) curve m(t) 924 of the malignant tissue rises quickly above the step function curve 922 and then asymptotically approaches the step function curve 922, while the brightness (contrast) curve b(t) 926 of the benign tissue rises slowly underneath the step function curve 922 and then asymptotically approaches it. People skilled in the art recognize that the brightness (contrast) curve m(t) 924 resembles a step response of an underdamped dynamic system, while the brightness (contrast) curve b(t) 926 resembles a step response of an overdamped or critically damped dynamic system.

FIG. 9D depicts a general approach to identifying the behavior of a dynamic system. For a dynamic system 930 of unknown behavior, a step function 928 is used as an excitation. A response 932 to the step function 928 from the dynamic system 930 is fed to a system identification step 934 in order to estimate the dynamic parameters of system 930.

An exemplary realization of dynamic system modeling (step 912) is shown in FIG. 9E, which illustrates the use of an autoregressive (ARX) model 936. See L. Ljung, "System Identification Toolbox," The Math Works for a detailed description of the use of ARX models in system identification. A general ARX model can be expressed as:

$$y(t) = G(q)f(t) + H(q)\epsilon(t), \quad (1)$$

where G(q) 942 and H(q) 940 are the system transfer functions, u(t) 938 is the excitation, $\epsilon(t)$ 944 is the disturbance, and y(t) 946 is the system output. It is known that the transfer functions G(q) 942 and H(q) 940 can be specified in terms of rational functions of $q^{-1}$, with numerator and denominator coefficients in form:

$$G(q) = q^{-nk} \frac{B(q)}{A(q)}, \quad (2)$$

$$H(q) = \frac{1}{A(q)}, \quad (3)$$

where A(q) and B(q) are polynomials in the delay operator $q^{-1}$:

$$A(q) = 1 + a_1 q^{-1} + \ldots + a_{na} q^{-na}, \quad (4)$$

$$B(q) = b_1 + b_2 q^{-1} + \ldots + a_{nb} q^{-nb+1}. \quad (5)$$

The ARX model of the system can be explicitly rewritten as $$y(t) = -a_1 y(t-1) - \ldots - a_{na} y(t-na) + b_1 u(t-nk) + \ldots,$$
$$b_{nb} u(t-nk-nb+1) + e(t). \quad (6)$$

Equation (6) can be further rewritten in the linear form:

$$y(t) = \varphi(t)^T \theta, \quad (7)$$

$$\text{where } \varphi(t) = \begin{bmatrix} -y(t-1) \\ \vdots \\ -y(t-na) \\ u(t-nk) \\ \vdots \\ u(t-nk-nb+1) \end{bmatrix} \text{ and } \theta = \begin{bmatrix} a_1 \\ \vdots \\ a_{na} \\ b_1 \\ \vdots \\ b_{nb} \end{bmatrix}.$$

The system identification solution for the coefficient vector $\theta$ is given by:

$$\hat{\theta} = (\Phi^T \Phi)^{-1} \Phi^T Y, \quad (8)$$

$$\text{where } \Phi = \begin{bmatrix} \varphi^T(t_0) \\ \vdots \\ \varphi^T(t_0 + N_t - 1) \end{bmatrix}, \quad (9)$$

and $$Y = \begin{bmatrix} y(t_0) \\ \vdots \\ y(t_0 + N_t - 1) \end{bmatrix}. \quad (10)$$

In Equations (9) and (10), $t_0$ is the data sampling starting time and $N_t$ is the number of samples.

In relation to the brightness (contrast) curves m(t) 924 and b(t)

$$\varphi(t) = \begin{bmatrix} -m(t-1) \\ \vdots \\ -m(t-na) \\ u(t-nk) \\ \vdots \\ u(t-nk-nb+1) \end{bmatrix} \text{ for } m(t),$$

$$\text{and } \varphi(t) = \begin{bmatrix} -b(t-1) \\ \vdots \\ -b(t-na) \\ u(t-nk) \\ \vdots \\ u(t-nk-nb+1) \end{bmatrix} \text{ for } b(t).$$

In this particular case, u(t) is a step function, and the corresponding solutions are $\hat{\theta}_m$ and $\hat{\theta}_b$. The computation of $\hat{\theta}$ realizes the step of dynamic system identification 910 (also step 934).

In order to classify (step 914) a region with high contrast brightness in MR images as benign or malignant, a supervised learning step 918 is employed. The exemplar inputs to the supervised learning step 918 are $\hat{\theta}_m$ and $\hat{\theta}_b$ (the known curves), and the exemplar desired outputs are indicators $O_m$ and $O_b$ for malignant and benign tumors, respectively. In FIG. 9B, step 918 receives M sample dynamic curves with known characteristics (benign or malignant) from step 916. An exemplary value for M could be 100. Within the M curves, there are $M_m$ curves belong to malignant tumors and $M_b$ curves belong to benign tumors. Exemplary values for $M_m$ and $M_b$ could be 50 and 50. In step 918, applying equation (8) to all of the sample curves generates M coefficient vectors $\hat{\theta}$, among which $M_m$ coefficient vectors (denoted by $\hat{\theta}_m^i$, i= 1 ... $M_m$) represent malignant tumors with indicator $O_m$, and $M_b$ coefficient vectors (denoted by $\hat{\theta}_b^i$, i=1 ... $M_b$) represent benign tumors with indicator $O_b$. These learned coefficient vectors $\hat{\theta}_m^i$ and $\hat{\theta}_b^i$ are used to train a classifier that in turn is used to classify a dynamic contrast curve in a detection or diagnosis process.

To increase the specificity (accuracy in differentiating benign tumors from malignant tumors), other factors (step 920) may be incorporated into the training (learning) and classification process. It is known that factors such as the speed of administration of the contrast agent, timing of contrast administration with imaging, acquisition time and slice thickness all affect specificity (see C. Piccoli, "Contrast-enhanced Breast MRI: Factors Affecting Sensitivity and Specificity," Eur. Radiol. 7 (Suppl. 5), S281-S288, 1997).

Denote the speed of administration of the contrast agent by α, the timing of contrast administration with imaging by β, the acquisition time by γ and slice thickness by δ. These exemplary factors are to be used in conjunction with the coefficient vectors $\hat{\theta}_m^i$ and $\hat{\theta}_b^i$ to train the classifier that in turn is used to classify a region in the MR breast image into malignant or benign tumor classes. Note that these exemplary factors should be quantified in a range comparable to that of the coefficient vectors $\hat{\theta}_m^i$ and $\hat{\theta}_b^i$. For the purpose of learning or training, the following data set is constructed:

$$\{p_j, \tau_j\}, j=1 \ldots l, \tau_j=\{-1,1\}, p_j \in R^d, \quad (11)$$

where $\tau_j$ are the class labels. For example, if the tumor is malignant, $\tau_j=1$, otherwise, $\tau_j=-1$. The vector $p_j=[\hat{\theta}, \alpha, \beta, \gamma, \delta]$ is the feature vector, or vector of extracted features. The $R^d$ represents a domain, and d is the domain dimension. For this exemplary case, assume that the coefficient vector θ has five elements, so d=5. The data format in Equation (11) is used in leaning step 918 as well as in the classification step 914. People skilled in the art understand that the data vector $p_j$ can be constructed in a different manner and augmented with different physical or non-physical numerical elements (factors) other than the ones aforementioned.

There are many types of classifiers that can be used to accomplish the task of differentiating malignant tumors from benign tumors with the use of dynamic contrast curves along with other physical or non-physical factors. An exemplary classifier is a SVM (support vector machine) (see C. Burges, "A Tutorial on Support Vector Machines for Pattern Recognition," *Data Mining and Knowlege Discovery*, 2(2), 1-47, 1998, Kluwer Academic Publisher, Boston). A simple example case of an SVM classifier would be training and classification of data representing two classes that are separable by a hyper-plane. A hyper-plane that separates the data satisfies $$w \cdot p + \sigma = 0, \quad (12)$$

where · is the standard inner product (dot product). The goal of training the SVM is to determine the free parameters w and σ. A scaling factor can always be applied to w and σ such that all the data obey the paired inequalities:

$$\tau_j(w \cdot p_j + \sigma) - 1 \geq 0, \forall_j, \quad (13)$$

Equation (13) can be solved by minimizing the Lagrangian function $$L(w, \xi) = \frac{1}{2}\|w\|^2 - \sum_{j=1}^{l} \xi_j(\tau_j(w \cdot p_j + \sigma)) \quad (14)$$

with respect to the parameter w, and maximizing it with respect to the undetermined multipliers $\xi_j \geq 0$.

After the optimization problem has been solved, the expression for w in equation (13) can be rewritten in terms of the support vectors with non-zero coefficients and plugged into the equation for the classifying hyper-plane to give the SVM decision function:

$$\Psi(p_{new}) = (w \cdot p_{new} + \sigma) = \sum_{j=1}^{l_s} \tau_j \xi_j p_j \cdot p_{new} + \sigma, \quad (15)$$

where $l_s$ is the number of support vectors. Classification of a new vector $p_{new}$ into one of the two classes (malignant and benign) is based on the sign of the decision function. People skilled in the art are aware that in non-separable cases, non-linear SVMs can be used.

All documents, patents, journal articles and other materials cited in the present application are hereby incorporated by reference.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A system for the detection of abnormalities in a medical image of a subject, comprising:
   an examination bundle including at least one medical image of the subject from a first modality and at least one medical image of the subject from at least a second modality;
   a mapping engine for defining a correspondence relationship between the at least one medical image from the first modality and the at least one medical image from the at least second modality;
   a training/learning engine for determining the characteristics of abnormalities using features extracted within the at least one medical image from the first modality and the at least one medical image from the at least second modality;
   a classification engine for detecting abnormalities within at least one of the medical images comprising the examination bundle; and
   a combining module combining training/learning processes for determining the characteristics of abnormalities using features extracted from the first and second modalities and the detected abnormalities from the first and second modalities using the classification engine for diagnosis and identifying abnormalities detected in both of the first and second modalities.

2. The system of claim 1, wherein the training/learning engine registers the at least one medical image from the first modality with the at least one medical image from the second modality.

3. The system of claim 2, wherein the training/learning engine performs parametric image registration, non-parametric image registration, intensity-based registration, correlation-based registration, or mutual information-based registration.

4. The system of claim 1, wherein the training/learning engine registers at least one medical image from at least one modality to an atlas image.

5. The system of claim 1, wherein the training/learning engine comprises (a) a first learning module for determining the characteristics of abnormalities within the at least one medical image from the first modality and (b) a second learning module for determining the characteristics of abnormalities within the at least one medical image from the second modality; and
- wherein the classification engine comprises (a) a first detecting module for detecting abnormalities within the at least one medical image from the first modality, and (b) a second detecting module for detecting abnormalities within the at least one medical image from the second modality.

6. The system of claim 5, wherein at least one of the first or second learning modules incorporates predetermined knowledge of the characteristics of abnormalities.

7. The system of claim 5, wherein the classification engine further comprises a combining module for combining the detected abnormalities from the first detecting module with the detected abnormalities from the second detecting module.

8. A system for the detection of abnormalities in a medical image of a subject, comprising:
- an examination bundle including at least one medical image of the subject from a first modality and at least one medical image of the subject from at least a second modality;
- a plurality of trained images employed for determining the characteristics of abnormalities within the at least one medical image from the first modality and the at least one medical image from the at least second modality;
- a classification engine for detecting abnormalities within the medical images of the first and second modalities comprising the examination bundle using the characteristics; and
- a combining module combining the detected abnormalities for determining the characteristics of abnormalities using features extracted from the first and second modalities and the detected abnormalities of the classification engine for diagnosis and identifying abnormalities detected in both of the first and second modalities.

9. The system of claim 8, further comprising a mapping engine for defining a correspondence relationship between the at least one medical image from the first modality and the at least one medical image from the second modality.

10. The system of claim 1, wherein the combining module determines joint characteristics from both the first and second modalities.

11. The system of claim 1, wherein the combining module identifies all detected abnormalities, identifies abnormalities detected by one modality, identifies abnormalities detected by both modalities and identifies abnormalities detected by a chosen modality.

12. A method, comprising:
- determining characteristics of abnormalities in medical images of plural modalities using a training/learning engine;
- detecting and classifying abnormalities in the images using a classification engine; and
- combining the classified abnormalities and image features of the medical images of the plural modalities for use in computer aided analysis and diagnosis applied to an examination image bundle including patient images in the first and second modalities and one of identifying an abnormality detected in more than one of the plural modalities, and identifying an abnormality detected in a chosen modality and another one of the plural modalities.

* * * * *